US006670608B1

(12) United States Patent
Taylor et al.

(10) Patent No.: US 6,670,608 B1
(45) Date of Patent: Dec. 30, 2003

(54) GAS SAMPLING SYSTEM FOR A MASS SPECTROMETER

(75) Inventors: Charles E. Taylor, Mt. Lebanon, PA (US); Edward P. Ladner, Baldwin Borough, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 210 days.

(21) Appl. No.: 09/950,643

(22) Filed: Sep. 13, 2001

(51) Int. Cl.[7] .......................... B01D 59/44; H01J 49/01
(52) U.S. Cl. ...................................................... 250/288
(58) Field of Search .......................................... 250/288

(56) References Cited

U.S. PATENT DOCUMENTS 5,572,023 A * 11/1996 Caprioli ...................... 250/288
2002/0121596 A1 * 9/2002 Laiko et al. ................ 250/288
2003/0020013 A1 * 1/2003 Sakairi ....................... 250/288

* cited by examiner

*Primary Examiner*—Stephen Meier
*Assistant Examiner*—Alfred Dudding
(74) *Attorney, Agent, or Firm*—Joy Alwan; Thomas G. Anderson; Paul A. Gottlieb

(57) ABSTRACT

The present invention relates generally to a gas sampling system, and specifically to a gas sampling system for transporting a hazardous process gas to a remotely located mass spectrometer. The gas sampling system includes a capillary tube having a predetermined capillary length and capillary diameter in communication with the supply of process gas and the mass spectrometer, a flexible tube surrounding and coaxial with the capillary tube intermediate the supply of process gas and the mass spectrometer, a heat transfer tube surrounding and coaxial with the capillary tube, and a heating device in communication the heat transfer tube for substantially preventing condensation of the process gas within the capillary tube.

27 Claims, 5 Drawing Sheets

NETL MODIFICATIONS

Option 2 - Instrument Specific Application

FIGURE 2. NETL MODIFICATIONS

Option 2 - Instrument Specific Application

FIGURE 3 NETL MODIFICATIONS

Detail of Capillary Seal Inside Instrument

(Details of Machined Block)

(Connection of Capillary Sampling to Gas Stream)

GAS SAMPLING SYSTEM FOR A MASS SPECTROMETER

CONTRACTUAL ORIGIN OF THE INVENTION

The United States Government has rights in this invention through an employer-employee relationship between the U.S. Department of Energy and The National Energy Technology Laboratory.

FIELD OF THE INVENTION

The present invention relates generally to a gas sampling system, and specifically to a gas sampling system for transporting a hazardous process gas from a supply thereof to a remotely located mass spectrometer.

BACKGROUND ART

Mass spectrometry is an analytical method widely used to determine the atomic weight and structure of molecules. The basic technique is carried out at extremely low pressures, and consists of bombarding a gas-phase sample with an electron beam strong enough to fragment the molecules into their respective ions, after which the gas phase ions are separated and analyzed according to their mass-to-charge ratios (m/e). This technique is practiced using a mass spectrometer, which typically consists of five main components: a vacuum system; an inlet into which the sample is introduced; an ion source which separates molecules into their respective ions; an analyzer which separates those ions based on their mass-to-charge ratios; and a detector.

Mass spectrometers are often used to provide real-time analysis of process gases formed during a chemical reaction. However, the mass spectrometer employed is typically located at a remote distance from the process apparatus, typically at a distance of six feet or more. Therefore, a quantity of the process gas must be withdrawn from the process apparatus and transported to the mass spectrometer by way of an inlet system.

Conventional inlet systems accomplish this task by transporting a bulk quantity of sample process gas to the mass spectrometer. At or near the mass spectrometer, an aliquot of the bulk sample is removed and fed into the mass spectrometer. The remaining sample gas is then either returned to the process apparatus, or is simply directed to an exhaust stack, incinerator or the like.

However, conventional inlet systems are inadequate for transporting hazardous process gases (i.e.: gases which are toxic or explosive), because conventional inlet systems withdraw large quantities of the process gas from the process apparatus. The risk of leakage from the inlet system is ever-present. If the process gas is toxic or possibly explosive then possible leakage is unacceptable. Further, the mass spectrometer employed is usually located at a remote distance from the process apparatus, typically a distance of 6 feet or more, further increasing the risk of leakage.

One answer to the above problem is to withdraw smaller amounts of gas, but such conventional inlet systems are inadequate for transporting low flow rate process gasses on the order of less than 10 mL/min. Conventional inlet systems require a process gas flow rate of approximately 60 to 100 mL/min in order to maintain the internal pressure of the mass spectrometer, and to provide a sufficient amount of material to obtain a signal from the instrument. However, where the flow rate of the process gas is on the order of 1 to 5 mL/min, conventional inlet systems cannot be used.

Therefore, it is a first object of the present invention to provide an apparatus for safely transporting a hazardous process gas to a mass spectrometer.

A second object of the present invention is to provide an apparatus for transporting a low flow rate process gas to a mass spectrometer which is located at a remote distance from the process apparatus.

A third object of the present invention is to provide an inlet system which eliminates the need for a process gas return line from the inlet system to the process apparatus.

A further object of the present invention is to provide an inlet system which withdraws an aliquot from process apparatus rather than a gas stream introduced into the inlet system.

Another object of the present invention is to provide a heating device for substantially preventing condensation of the process gas within the inlet system.

Yet another object of the present invention is to provide an inlet system that is easy and economical to manufacture, yet durable.

Another object of the present invention is to provide a method for readily calculating the requisite length and diameter for the conduit which transports the gas from the process apparatus to the mass spectrometer.

SUMMARY OF THE INVENTION

The above-listed objects are met or exceeded by the present gas sampling system for transporting a low flow rate process gas from a remotely located process apparatus or other supply thereof to a mass spectrometer. The gas sampling system includes a capillary tube having a predetermined capillary length and capillary diameter in communication with the supply of process gas and the mass spectrometer, a flexible tube surrounding and coaxial with the capillary tube intermediate the supply of process gas and the mass spectrometer, a heat transfer tube, and a heating device in communication the heat transfer tube for substantially preventing condensation of the process gas within the capillary tube.

BRIEF DESCRIPTION OF THE DRAWINGS

Other objects and advantages of the invention will become apparent upon reading the following detailed description and upon reference to the drawings in which.

DESCRIPTION OF THE INVENTION

Figure 1:
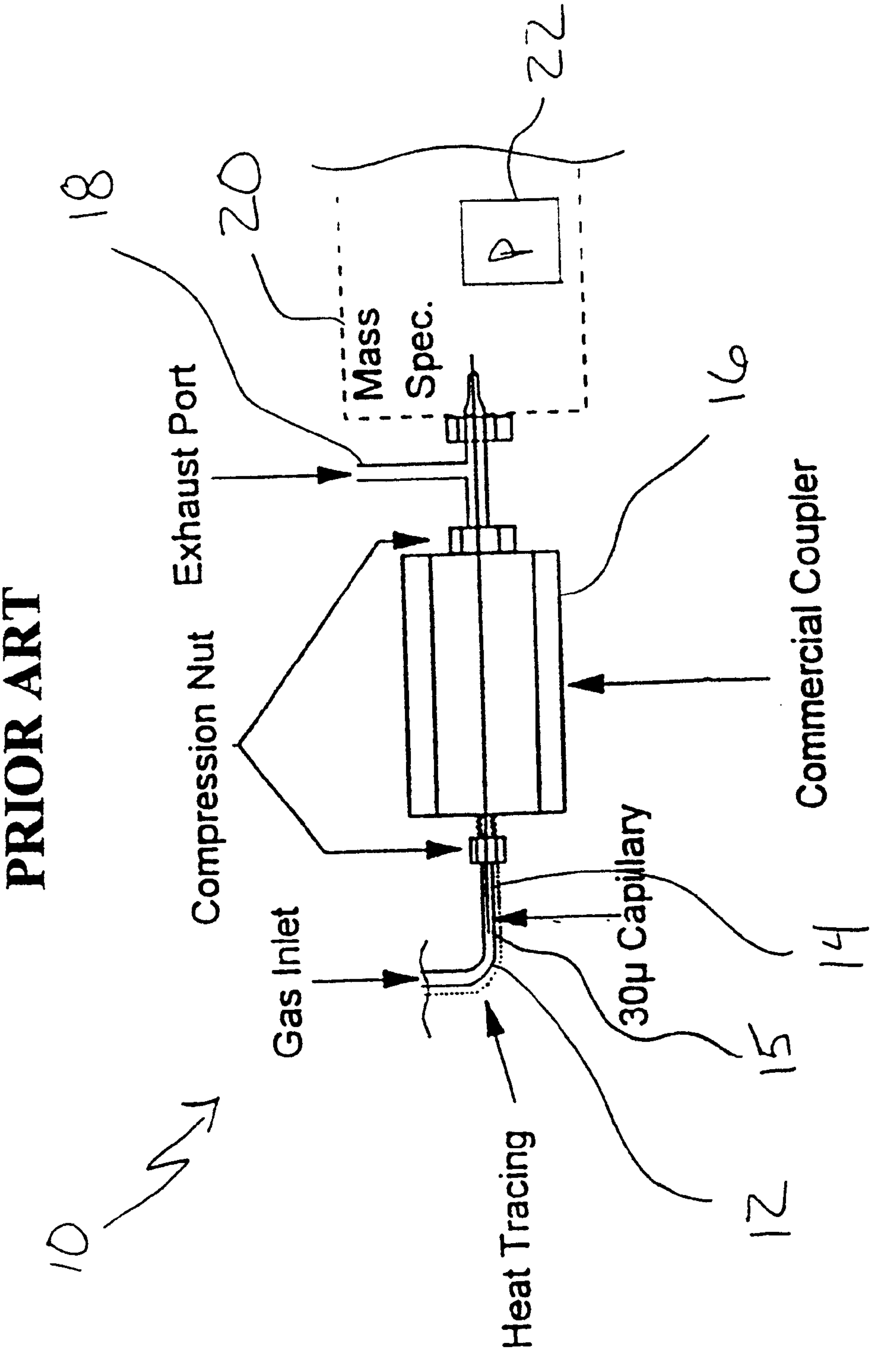
FIGURE 1 PRIOR ART
FIG. 1 is a schematic diagram of a prior art mass spectrometer inlet system.

While this invention is susceptible of embodiment in many different forms, there is shown in the drawings and will herein be described in detail, one specific embodiment, with the understanding that the present disclosure is to be considered merely an exemplification of the principles of the invention and is not intended to limit the invention only to the embodiment illustrated.

FIG. 1 illustrates a conventional mass spectrometer inlet system 10. A bulk quantity of sample gas is introduced from a remotely located process apparatus (not shown) into an inlet tube 12. Contained within the inlet tube 12 is a capillary tube 14. In general, capillary tubes 12 employed in conventional mass spectrometer inlet systems 10 do not exceed six inches in length, whereas the inlet tube 12 may exceed six feet in length. The capillary tube 14 extends through a commercial coupler 16 and into a mass spectrometer 20. Mass spectrometers 20 operate below atmospheric pressure, often at an order of magnitude of approximately$10^{-6}$ torr. To reach the desired pressure, the mass spectrometer 20 is provided with a pump 22 for evacuating the mass spectrometer 20.

As the bulk quantity of sample gas flows past the tip 15 of the capillary tube 14, the capillary tube 14 skims an aliquot from the bulk sample. The excess sample gas, namely the gas which is not skimmed, flows through the coupler 16, exits the inlet system 10 through an exhaust port 18, and is returned to the process apparatus, or is incinerated or otherwise treated or disposed.

Figure 2:
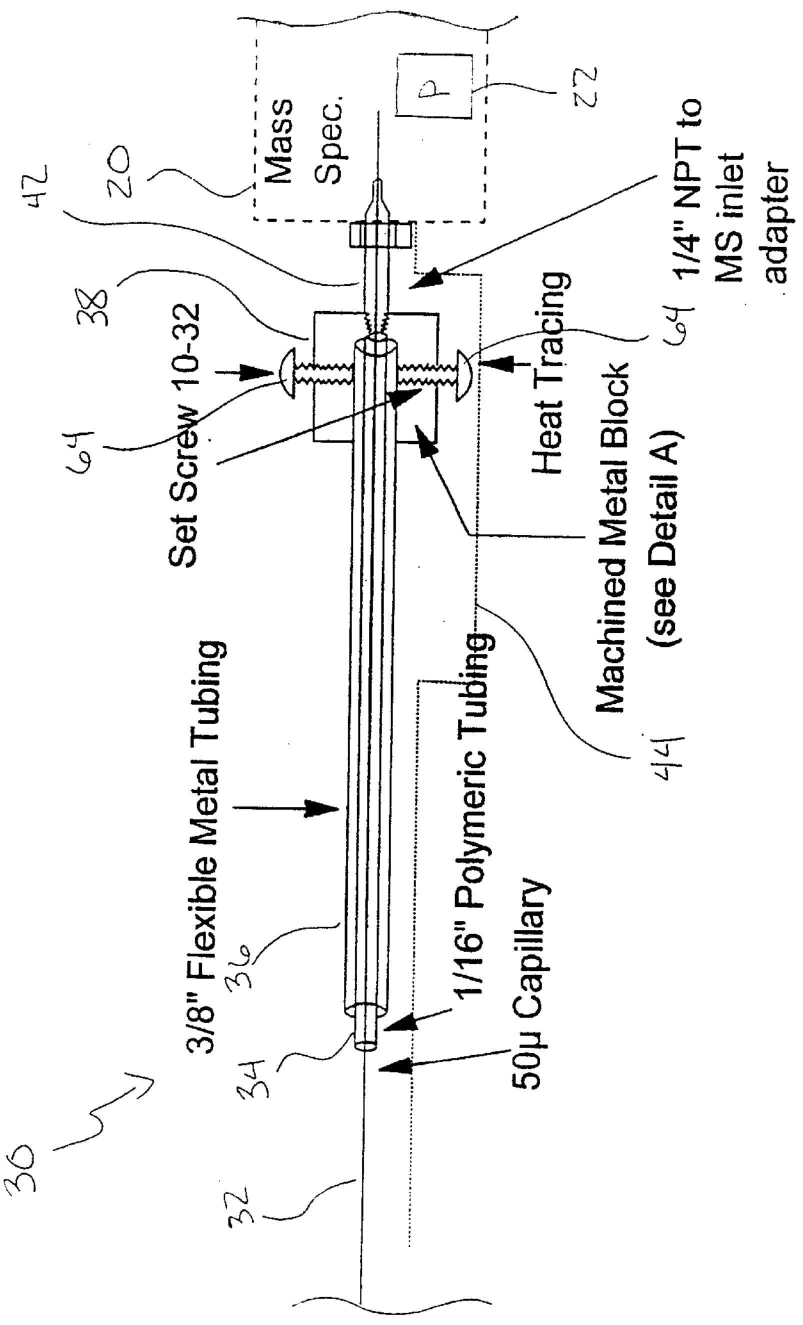
FIG. 2 is a schematic diagram of the gas sampling system of the present invention.

As shown in FIG. 2 and as previously mentioned, the gas sampling system 30 of the present invention includes a capillary tube 32 extending from a supply of process gas (not shown) to the mass spectrometer 20. The capillary tube 32 is provided for transporting an aliquot of process gas to the mass spectrometer 20. A flexible tube 34 surrounds and is coaxial with the capillary tube 32 for protecting the capillary tube 32, and a heat transfer tube 36 surrounds and is coaxial with the flexible tube 34.

A coupler subassembly 38 and an inlet adapter 42 are provided for connecting the sampling system 30 to the mass spectrometer 20. The capillary tube 32 extends from within the mass spectrometer 20, through the inlet adapter 42 and coupler subassembly 38, through the flexible tube 34, and into the process gas stream of the supply.

The gas sampling system 30 also includes a heating device 44 in heat transfer relationship with the capillary tube 32 for "substantially" preventing the process gas from condensing within the capillary tube 32. The heating device 44 directly contacts and heats the heat transfer tube 36, coupler 38 and inlet adapter 42, thereby heating the capillary tube 32. In the preferred embodiment, the heating device 44 is a conventional resistance heater (i.e.: heat tape/thermocouple combination). Alternate embodiments are contemplated wherein the heating device 44 includes a heated liquid or gas in heat transfer relationship with the gas sample system 30.

The capillary tube 32 utilized in the preferred embodiment is manufactured from fused silica, and has a polyimide protective outer coating. However, capillary tubes 32 which are constructed from other materials (i.e.: brass) are commercially available. In general, the capillary tube 32 selected should be capable of withstanding the temperature of the process gas, and should be inert relative to the process gas. Capillary tubes 32 are readily available, and one with ordinary skill in the art could select a capillary tube which suits the particular application for which the system 30 is to be employed.

In addition, the capillary tube 32 utilized in the preferred embodiment has a circular cross section. However, the shape of the cross section of the capillary tube 32 is not critical. An alternate capillary tube 32 may be employed which has a square cross section or the like.

Because the capillary tube 32 employed is susceptible to damage (i.e.: hairline fractures, chipping and scoring), it is preferred that the flexible tube 34 have a smooth inner coating for substantially preventing damage to the capillary tube 32 upon insertion into the flexible tube 34. In the preferred embodiment, the flexible tube 34 is manufactured from a polymeric material, and has a Teflon® inner coating. It has been found that such a flexible tube 34 can withstand temperatures of up to approximately 300° C. For higher temperature applications, alternate embodiments have been employed wherein the flexible tube 34 is manufactured from a metallic material such as brass. However, when metallic materials are employed, care must be take to ensure that no burrs are present at or near the ends of the flexible tube 34 to ensure the capillary tube 32 is not damaged upon insertion into the flexible tube 34.

The heating tube 36 employed in the preferred embodiment is manufactured from a flexible metallic material such as brass or the like. By using brass, the heating tube 36 can withstand direct contact with the heating device 44, it can be soldered, brazed or welded to the coupler 38 and process gas supply to provide additional protection against leakage of the process gas, and provides additional rigidity to the gas supply system 30. However, it should be noted that the heating tube 36 is not critical to the invention, and could be combined with the flexible tube 34.

Figure 3:
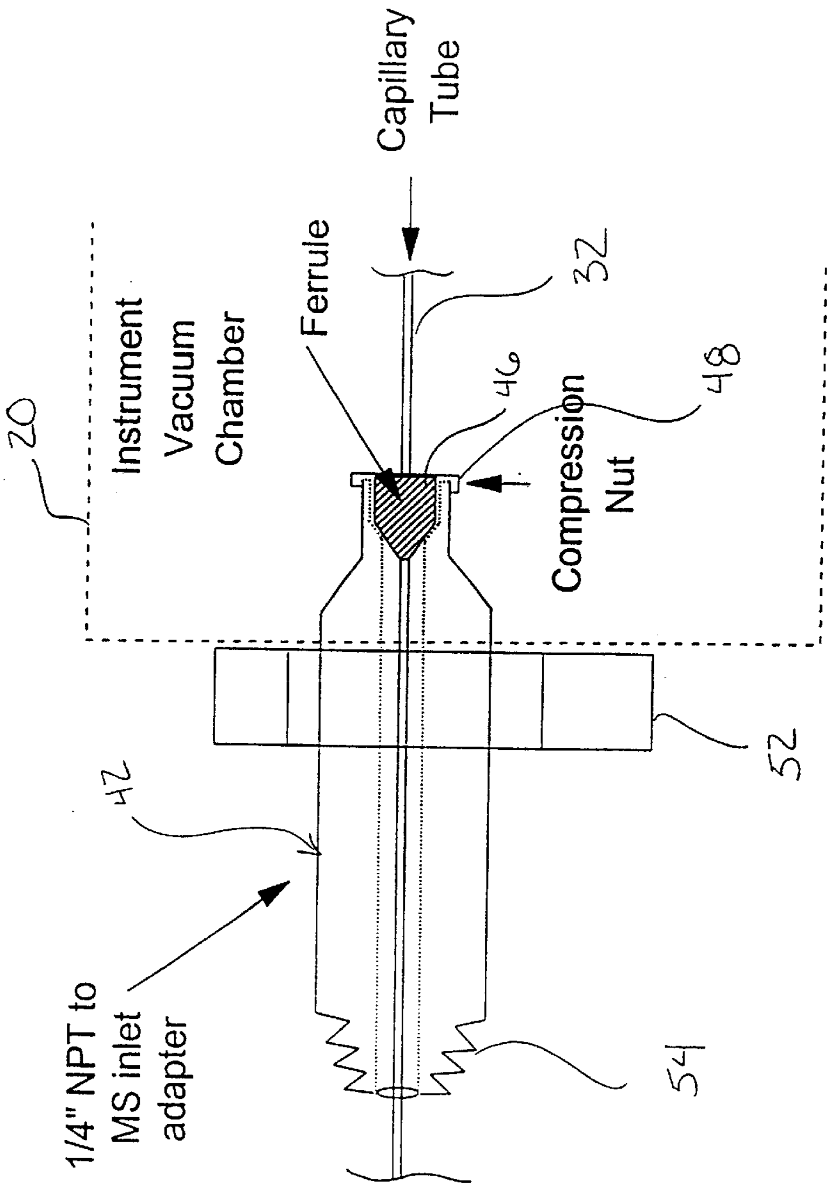
FIG. 3 is a schematic diagram of an inlet adapter and mass spectrometer showing the relationship of the capillary tube and mass spectrometer in greater detail.

FIG. 3 a schematic diagram of an inlet adapter 42 and mass spectrometer 20 showing the relationship of the capillary tube 32 and mass spectrometer 20 in greater detail. The inlet adapter 42 sealingly connects the capillary tube 32 to the mass spectrometer 20, thereby providing a pathway for the process gas into the mass spectrometer 20. The capillary tube 32 extends from within the mass spectrometer 20, and into and through the inlet adapter 42. A ferrule 46 in combination with a ferrule compression nut 48 located inside the mass spectrometer 20 sealingly engages the outer surface of the capillary tube 32. Because the mass spectrometer 20 typically operates below atmospheric pressure, often at an order of magnitude of approximately $10^{-6}$ torr, this seal is required so as to maintain the pressure within the mass spectrometer 20.

Figure 4:
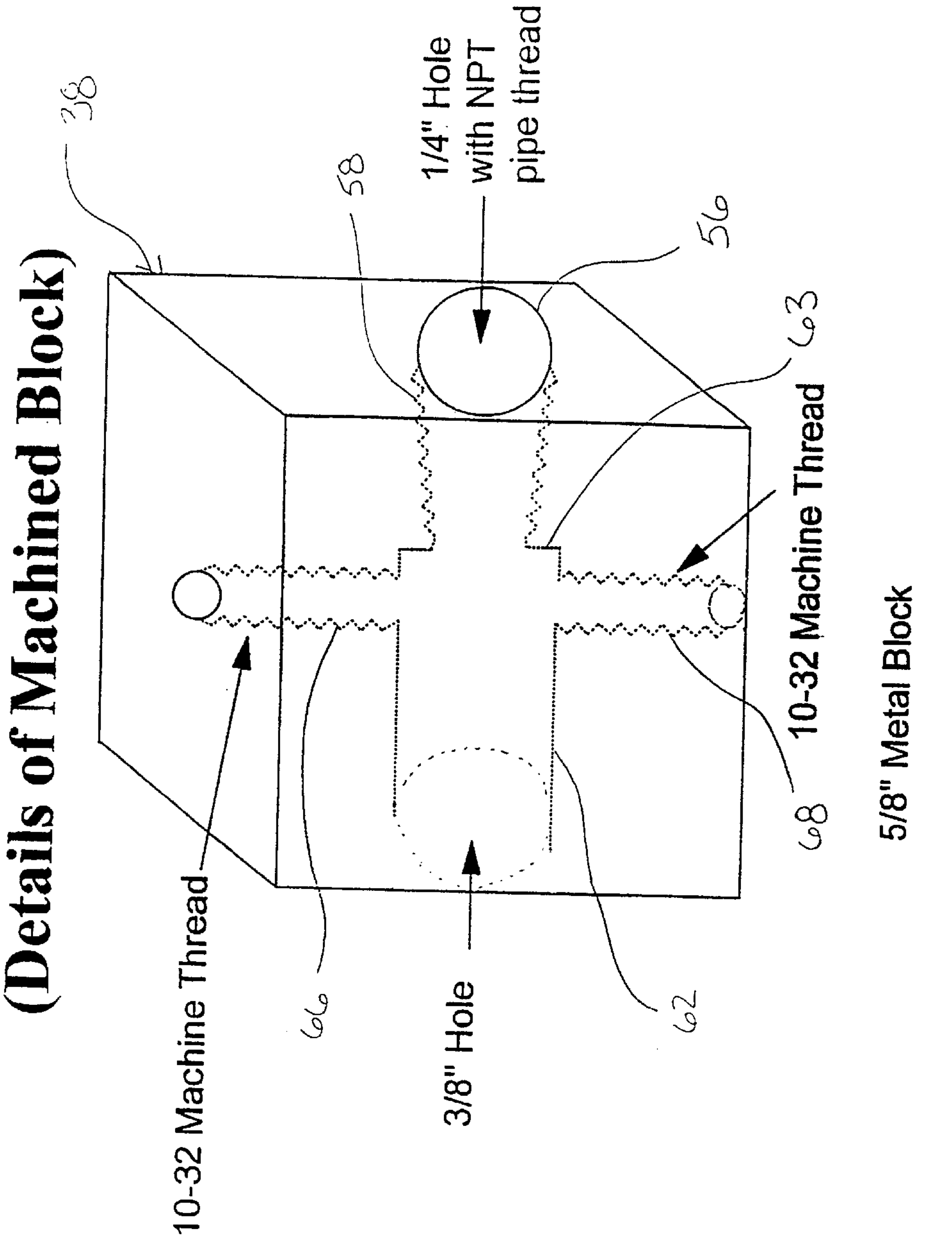
FIG. 4 is a schematic diagram of a coupler for attaching the gas sampling system to a mass spectrometer.

An inlet adapter compression nut 52 sealingly connects the inlet adapter 42 to the mass spectrometer 20. Male threads 54 are provided on one end of the inlet adapter 42, for a purpose hereafter set forth. Referring to FIGS. 3 and 4 in combination, an inlet opening 56 is provided within the coupler 38 for receiving the inlet adapter 42. Female threads 58 within the inlet opening 56 mate with or engage the male threads 54.

A heating tube opening 62 extends into the coupler 38, and terminates at edge 63. The heating tube opening 62 has a larger diameter than the inlet opening 56. The heating tube 36 is inserted into the heating tube opening 62 and initially secured by two opposing set screws 64 (see FIG. 2). The set screws 64 extend into the heating tube opening 62 through a first and second set screw opening 66 and 68, respectively. Although two set screws 64 are shown in the figures, alternate embodiments are contemplated wherein only one set screw 64 is utilized, or wherein more than two set screws 64 are utilized. The heating tube 36 is further secured within the heating tube opening 62 by welding, soldering or brazing the heating tube 36 to the coupler assembly 38.

Figure 5:
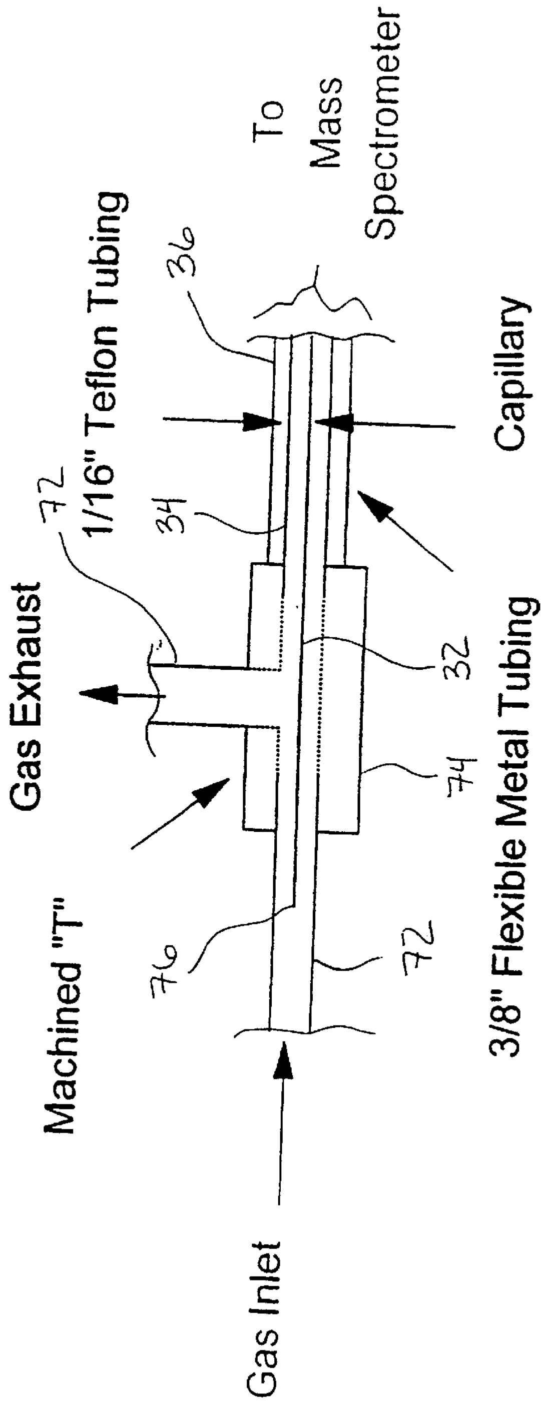
FIG. 5 is a schematic diagram of the connection of the gas sampling system to the supply or process apparatus.

FIG. 5 is a schematic diagram of the connection of the gas sampling system 30 to a gas stream line 72 from the process apparatus (not shown). A t-shaped fitting 74 is inserted into the gas stream line 72 for connecting the gas sampling system 30 to the gas stream line 72. The flexible tube 34 is inserted into one of the three openings of the fitting 74. The capillary tube 32 is inserted into and through the fitting 74 so that the tip 76 of the capillary tube 32 extends into the process gas stream. The heating tube 36 is secured to the fitting 74 by welding, soldering or brazing the heating tube 36 to the fitting 74.

Referring to FIGS. 2 through 5 in combination, assembly of the gas sampling system 30 will now be described with reference to a specific example. In this example, a gas sampling system 30 was constructed for transporting a process gas from a process apparatus exhaust pipe to an Extrel Quester GP mass spectrometer located approximately 6 feet from the process apparatus.

First, a capillary tube 32 was selected capable of withstanding the temperature and process gas to which the capillary tube 32 would later be subjected. Next, the requisite length and inner diameter for the capillary tube 32 was determined. The capillary tube 32 inner diameter and length are related by the general equation wherein len is the length of the capillary tube 32 in inches, D is the capillary $$\text{len} = \frac{(1{,}520 \cdot \text{len} \cdot \text{in}^3 \cdot \text{torr}^{-1} \cdot \text{sec}^{-1})(D)^4(P_1^2 - P_2^2)}{QP_2}$$

tube 32 diameter in inches, $P_1$ is the pressure in torr of the process gas at the supply, $P_2$ is the pressure in torr maintained in the mass spectrometer 20, and Q is the pumping speed of the pump 22 of the mass spectrometer 20 in liters per second.

It is prefered that the above-noted equation be solved by first determining the two pressures $P_1$ and $P_2$, the distance between the supply and the mass spectrometer 20, and the pumping speed Q of the mass spectrometer pump 22. By knowing the distance between the supply and the mass spectrometer 20, a capillary tube 34 can be selected which has an inner diameter D corresponding to a sufficient length [[L]] len of capillary tube 34.

In this example, a Pfeiffer TMU turbo pump was provided having a pumping speed Q of 56 liters/sec. The requisite internal pressure $P_2$ of the Extrel Model Quester GP was $3\times10^{-6}$ torr. The pressure of the process gas at the supply $P_1$ was $$\text{len} = \frac{\begin{array}{c}(1{,}520 \cdot \text{len} \cdot \text{in}^3 \cdot \text{torr}^{-1} \cdot \text{sec}^{-1}) \\ (5\times10^{-5}\ \text{m})^4\left[(760\ \text{torr})^2 - (3\times10^{-6}\ \text{torr})^2\right]\end{array}}{56\ \text{liters/sec} \times \frac{10^{-3}\ \text{m}^3}{1\ \text{liter}} \times 3\times10^{-6}\ \text{torr}} = 78\ \text{in}$$

determined to be 760 torr, the inner diameter D of the available capillary tube 34 was 50 $\mu$m. From these values, the following capillary tube length len was determined.

It should be noted that the above-noted general equation is derived from the equation obtained from *Perry's Chemical Engineers' Handbook*, 6$^{th}$ Edition, McGraw-Hill Publishers, pp. 5–16, and wherein $P_1$ is the absolute pressure at the inlet, $P_2$ is the absolute pressure at the outlet, f is the Fanning friction factor (dimensionless), len is the length of the capillary tube in feet, G is the mass velocity in lb./(sec.)(sq.ft.), R is the gas constant which equals 1546 (ft.)(lb.force)/(lb.-mole), T is the absolute pressure or degrees Fahrenheit plus 460, $g_c$ is the critical mass velocity in lb./(sec.)(sq.ft.), $R_H$ is the hydraulic radius in feet, and M is the molecular Once a capillary tube 32 having the requisite length and diameter was obtained, a length of heating tubing 36 was cut to length. The heating tube 36 was secured within the coupler 38 by the set screws 64. The heating tube 36 was further secured within the heating tube opening 62 by welding the heating tube 36 to the coupler 38.

The flexible tube 34 is then cut to length and inserted within the heating tube 34 so as to firmly abut the coupler edge 63. In the preferred embodiment, the opposite end of the flexible tubing 34 (the end which will be attached to the supply) extends approximately 1 inch from within the heating tube 36. By inserting the flexible tube 34 into the heating tube 36 prior to inserting the capillary tube 32 into the flexible tube 32, scoring and chipping of the capillary tube 32 was reduced. Next, the inlet adapter 42 was then inserted into the coupler inlet opening 56.

After the capillary tube 32 was inserted through the flexible tube 34, and through the coupler 38, the capillary tube 32 was then secured to the mass spectrometer 20 using the inlet adapter 42 as follows. First, the capillary tube 32 is first inserted into the inlet adapter 42, and then through the ferrule 46. The ferrule 46 was inserted into the inlet adapter 42, and secured within the adapter 42 by the ferrule compression nut 48. The inlet adapter 42/capillary tube 32 combination was secured to the mass spectrometer 20 by the inlet adapter compression nut 52. It is preferred that the capillary tube 32 extend from the inlet adapter 42 and into the ion source (not shown) of the mass spectrometer 20.

Next, the gas sampling system 30 was connected to the exhaust line 72 of the process apparatus (not shown). The t-shaped fitting 74 was inserted into the exhaust line 72 prior to assembly of the gas sampling system 30. The flexible tube 32 and capillary tube 32 were both inserted into one of the openings in the fitting 74. Next, the capillary tube 32 was positioned so that its tip 76 extended into the process gas stream. The heating tube 44 was then secured to the fitting 74 by welding the heating tube 36 to the fitting 74.

Finally, the heating tube 36 was wrapped with heating tape (generally discussed above as the heating device 44), and a thermocouple/temperature controller combination (not shown) were attached to the heating tape. The thermocouple/temperature controller (not shown) were provided for maintaining the process gas above its boiling point temperature as it passes through the gas sampling system 30. An insulation tape was wrapped over the heating tape to reduce heat loss.

The foregoing description of an embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims as set forth below.

The embodiments of the invention in which an exclusive property or privilege is claimed are defined as follows:

1. A system for transferring a sample of process gas from a supply thereof at a pressure $P_1$ to an inlet of a remotely located mass spectrometer maintained at a pressure $P_2$ by a pump having a pumping speed Q, comprising: a capillary conduit having a predetermined capillary length and capillary diameter, said capillary conduit in communication with the supply of process gas and the inlet of the spectrometer; and a flexible protective conduit surrounding said capillary conduit; said capillary length and said capillary diameter being related as wherein len is said capillary length in inches, D is said capillary diameter in inches, $$len = \frac{(1{,}520 \cdot len \cdot in^3 \cdot torr^{-1} \cdot sec^{-1})(D)^4(P_1^2 - P_2^2)}{QP_2}$$

$P_1$ is the pressure in torr of the process gas at the supply thereof, $P_2$ is the pressure in torr maintained in the mass spectrometer, and Q is the pumping speed in liters per second.

2. The system of claim 1, wherein said capillary conduit has a circularly-shaped cross section.

3. The system of claim 1, wherein said capillary conduit extends into the supply of process gas.

4. The system of claim 1, wherein said capillary conduit is manufactured from fused silica and has a polyimide protective outer coating.

5. The system of claim 1, wherein said flexible protective conduit has a smooth inner coating for substantially preventing damage to said capillary conduit upon insertion of said capillary tube into said flexible protective conduit.

6. The system of claim 5, wherein said smooth inner coating is Teflon.

7. The system of claim 1, further comprising a heating device in heat transfer relationship with said capillary conduit for substantially preventing condensation of the process gas within said capillary conduit.

8. The system of claim 7, wherein said heating device is a resistance heater.

9. The system of claim 7, further comprising a heating tube surrounding said flexible protective conduit in heat transfer relationship with said heating device.

10. The system of claim 9, further comprising a coupler interposed between said heating tube and said mass spectrometer for fixedly connecting said system to the mass spectrometer.

11. The system of claim 10, wherein said coupler includes a heating tube opening for receiving said heating tube.

12. The system of claim 11, wherein said coupler includes at least one set screw extending into said heating tube opening and contacting said heating tube for securing said heating tube within said heating tube opening.

13. The system of claim 11, wherein said heating tube is secured within said heating tube opening by welding said heating tube to said coupler.

14. The system of claim 11, wherein said coupler includes an inlet opening for receiving the inlet of the mass spectrometer.

15. A system for transferring a sample of process gas from a supply thereof at a pressure $P_1$ to an inlet of a mass spectrometer maintained at a pressure $P_2$ by a pump having a pumping speed Q remote from the supply, comprising:

- a capillary tube having a predetermined capillary length and capillary diameter in communication with the supply of process gas and the mass spectrometer;
- a flexible tube surrounding and coaxial with said capillary tube intermediate the supply of process gas and said coupler;

- a heat transfer tube surrounding and coaxial with said capillary tube; and
- a heat source in communication with said heat transfer tube for substantially preventing condensation of the process gas within said capillary tube;

said capillary length and said capillary diameter being related as $$len = \frac{(1{,}520 \cdot len \cdot in^3 \cdot torr^{-1} \cdot sec^{-1})(5 \times 10^{-5}\ m)^4\left[(760\ torr)^2 - (3 \times 10^{-6}\ torr)^2\right]}{56\ liters/sec \times \frac{10^{-3}\ m^3}{1\ liter} \times 3 \times 10^{-6}\ torr} = 78\ in$$

wherein len is said capillary length in inches, D is said capillary diameter in inches, $P_1$ is the pressure in torr of the process gas at the supply thereof, $P_2$ is the pressure in torr maintained in the analytical instrument, and Q is the pumping speed in liters per second.

16. The system of claim 15, wherein said capillary conduit has a circularly-shaped cross section.

17. The system of claim 15, wherein said capillary conduit extends into the supply of process gas.

18. The system of claim 15, wherein said capillary conduit is manufactured from fused silica and has a polyimide protective outer coating.

19. The system of claim 15, wherein said flexible protective conduit has a smooth inner coating for substantially preventing damage to said capillary conduit upon insertion of said capillary tube into said flexible protective conduit.

20. The system of claim 19, wherein said heating device is a resistance heater.

21. The system of claim 15, further comprising a heating tube surrounding said flexible protective conduit in heat transfer relationship with said heating device.

22. The system of claim 21, wherein said heating tube is brass.

23. The system of claim 22, further comprising a coupler interposed between said heating tube and said mass spectrometer for fixedly connecting said system to the mass spectrometer.

24. The system of claim 23, wherein said coupler includes a heating tube opening for receiving said heating tube.

25. The system of claim 24, wherein said coupler includes at least one set screw extending into said heating tube opening and contacting said heating tube for securing said heating tube within said heating tube opening.

26. The system of claim 24, wherein said heating tube is secured within said heating tube opening by welding said heating tube to said coupler.

27. The system of claim 24, wherein said coupler includes an inlet opening for receiving the inlet of the mass spectrometer.

* * * * *